United States Patent
Amendt et al.

(10) Patent No.: US 11,639,300 B2
(45) Date of Patent: May 2, 2023

(54) WATER SANITATION SYSTEM AND METHOD

(71) Applicant: Spa Logic, Inc., Thorsby (CA)

(72) Inventors: Darcy Amendt, Breton (CA); David Bradley Andersen, Thorsby, CA (US)

(73) Assignee: SPA LOGIC, INC., Thorsby (CA)

( * ) Notice: Subject to any disclaimer, the term of this patent is extended or adjusted under 35 U.S.C. 154(b) by 122 days.

(21) Appl. No.: 16/862,248

(22) Filed: Apr. 29, 2020

(65) Prior Publication Data

US 2020/0339447 A1 Oct. 29, 2020

Related U.S. Application Data

(60) Provisional application No. 62/840,012, filed on Apr. 29, 2019.

(51) Int. Cl.
  *C02F 1/461* (2006.01)
  *C02F 103/42* (2006.01)

(52) U.S. Cl.
  CPC ...... *C02F 1/46104* (2013.01); *C02F 2103/42* (2013.01); *C02F 2201/4614* (2013.01); *C02F 2201/4616* (2013.01); *C02F 2201/46135* (2013.01); *C02F 2209/02* (2013.01); *C02F 2209/04* (2013.01); *C02F 2209/05* (2013.01); *C02F 2209/06* (2013.01); *C02F 2209/11* (2013.01); *C02F 2209/29* (2013.01)

(58) Field of Classification Search
  CPC .. C02F 1/46104; C02F 1/461; C02F 2103/42; C02F 2201/46135; C02F 2201/4614; C02F 2201/4616; C02F 2209/02; C02F 2209/04; C02F 2209/05; C02F 2209/06; C02F 2209/11; C02F 2209/29; A61H 33/00; A61L 2/03; A61L 2/28; E04H 4/14
  USPC .......................................................... 210/243
  See application file for complete search history.

(56) References Cited

U.S. PATENT DOCUMENTS

| 5,487,788 A | * | 1/1996 | Kamiya .................. A61L 2/035 134/1 |
| 9,079,788 B2 | | 7/2015 | Mierswa |
| 2013/0193080 A1 | | 8/2013 | Grard et al. |

(Continued)

FOREIGN PATENT DOCUMENTS

| CA | 2394859 | 6/2001 |
| WO | 2006058369 | 6/2006 |

(Continued)

OTHER PUBLICATIONS

International Search Report and Written Opinion, PCT/CA2020/050570, dated Jul. 7, 2020, 8 Pages.

(Continued)

*Primary Examiner* — Akash K Varma
(74) *Attorney, Agent, or Firm* — Parlee McLaws LLP

(57) ABSTRACT

Systems and methods for electrolytic spa sanitation are provided which control electrodes in a manner that extends the use of electrodes, reducing the frequency of replacement of electrodes. The system also incorporates electrodes that can be easily replaced by a user, further reducing the need to maintenance by trained service personnel. Systems and methods use measurements from ORP, pH, and temperature sensors to determine the amount of sanitizer necessary to be produced from the electrodes. The electrodes are capable or acting as either an anode or a cathode.

18 Claims, 13 Drawing Sheets

(56) References Cited

U.S. PATENT DOCUMENTS

2013/0313115 A1\* 11/2013 Mierswa .................. C02F 1/48
                                                                                                                                                     204/554
2014/0106007 A1    4/2014  Shanahan et al.
2019/0025273 A1\*  1/2019  Brondum ............... G01N 33/18

FOREIGN PATENT DOCUMENTS

| WO | 2007140544 | 12/2007 | |
|---|---|---|---|
| WO | WO 2007/140544 A1 \* | 12/2007 | ............... A61L 2/03 |
| WO | 2018165118 | 9/2018 | |

OTHER PUBLICATIONS

Extended European Search Report on European Patent Application No. 20798316.4 dated Dec. 15, 2022.

\* cited by examiner

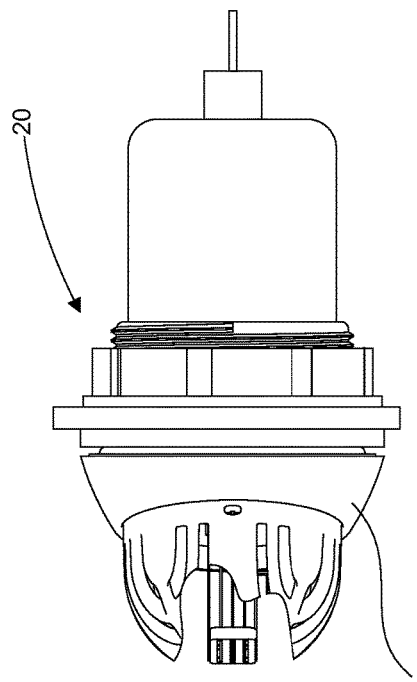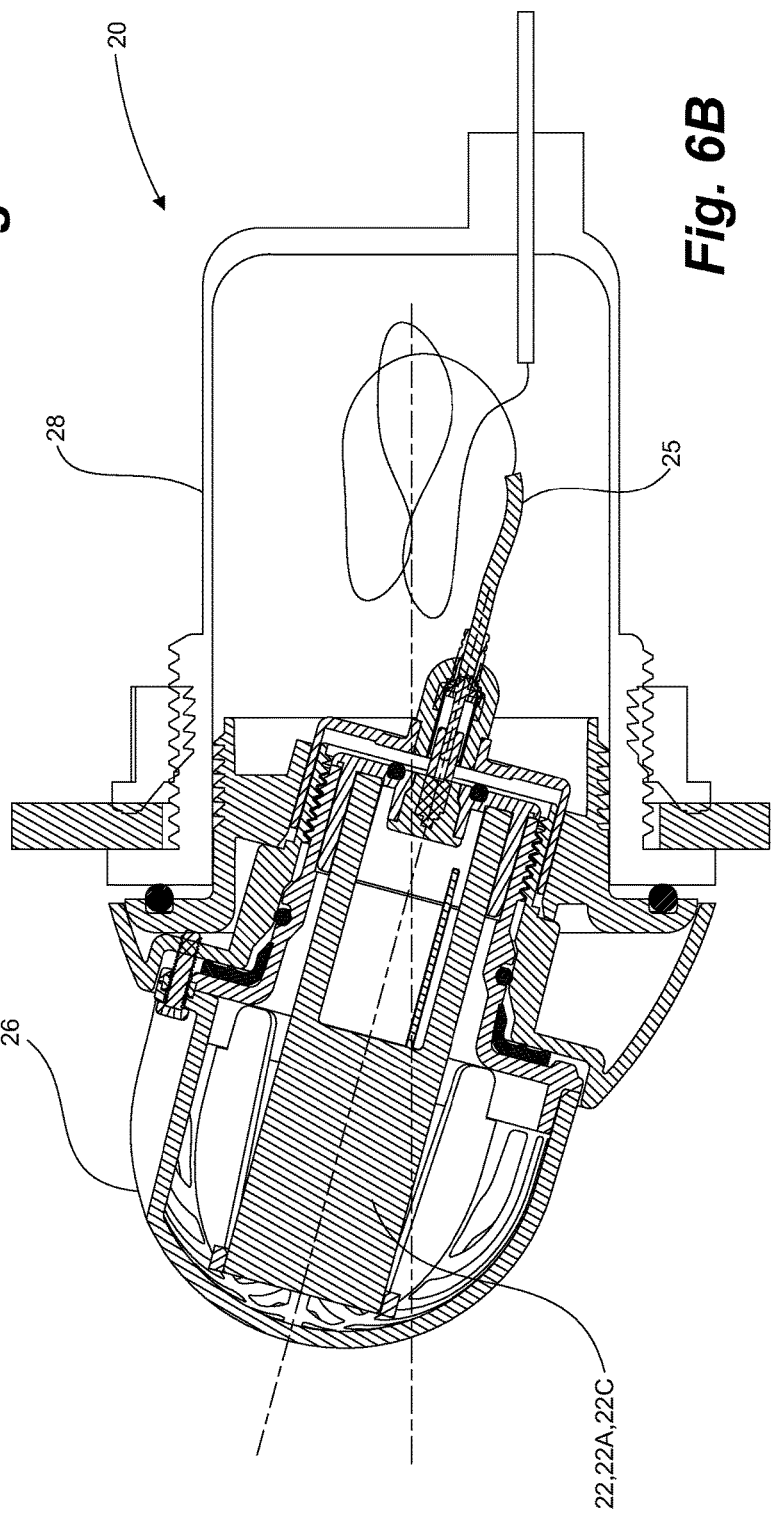
Fig. 6A
Fig. 6B

WATER SANITATION SYSTEM AND METHOD

CROSS-REFERENCE TO RELATED APPLICATIONS

This application claims the benefit of U.S. Provisional Application 62/840,012 filed Apr. 29, 2019 the entirety of which is incorporated fully herein by reference

FIELD

This disclosure relates to water sanitation systems. More particularly, the disclosure relates to water sanitation systems and methods which employ electrolysis to produce chlorine in salt water solutions.

BACKGROUND

Hot tubs, spas, and similar water-containing vessels typically comprise open structures adapted to heat a volume of water contained therein. Control means are normally provided for heating the water and for circulating the water via pumps and the like.

Water in hot tubs and spas can present an attractive environment for bacteria and viruses to grow, which can cause infection and disease. These organisms can also affect the oxygen and carbon dioxide concentrations in the water, leading to unbalanced hydrogen ion concentration (pH) levels which can in turn cause irritation of the eyes and skin. Water in hot tubs and spas may also change color due to the growth of organisms therein. To maintain the spa water in a clean and sanitary condition, the water is normally passed through a filter which removes and collects particulate matter. Further, sanitation systems are used to maintain water conditions that discourage bacterial, fungal and viral growth. Sanitation systems for use in the context of hot tubs or spas typically use electrolysis and/or the injection of chemicals to control water quality factors such as Oxidation Reduction Potential (ORP) and pH.

Generally, ORP is a measure of the dissolved oxygen in water expressed in millivolts (mV). A higher ORP is indicative of higher oxygen content and greater oxidizing or cleaning power of the water. pH measures how acidic or basic water is. More specifically, pH is a measure of the relative amount of free hydrogen and hydroxyl ions in the water. Water that has more free hydrogen ions (lower pH) is more acidic while water that has more free hydroxyl ions (higher pH) is more basic. Maintaining the pH of the spa water within an acceptable range is important for user comfort.

Sanitation systems typically include sensors to measure parameters relating to water chemistry, including pH and ORP, and mechanisms to adjust said parameters directly or indirectly. Chemical injection sanitation systems deliver metered doses of one or more chemicals to maintain water chemistry within a selected target range to maintain water clarity and sanitation.

Electrolytic sanitation systems pass electrical current between electrodes, comprising one or more cathodes and one or more anodes, and causes salt molecules (NaCl) in the water to split into sodium ($Na^+$) and chlorine ($Cl^-$) ions. Generation of chlorine sanitizes the water, thus increases the ORP thereof. This process is often preferred to chemical injection, as salt is present in most water supplies and can be easily added otherwise, chlorine is generated at a gradual pace, and there is no need to purchase and transport hazardous chemicals. The chlorine content of water can be estimated as a function of ORP, with higher ORP and lower pH indicating higher chlorine content.

Sanitation systems are often integrated into the water circulation system of the hot tub/spa, such as the pump, which allows for more efficient mixing of chlorine or other sanitation chemicals introduced or generated by the sanitation system into the water. However, such a configuration requires the water circulation system to be running in order to be effective, thus consuming more energy.

Electrolytic sanitation systems typically have designated anodes and cathodes whereby electrical current flows in one direction—from the anode to the cathode. The electrolytic process causes wear on the electrodes, increasing electrical impedance thereof. Over time, the impedance of the electrode plates becomes great enough to render the electrodes unusable, as the current generated by the voltage applied thereto is insufficient to generate enough chlorine, and the electrodes must be replaced.

In typical electrolytic systems, the anode wears out before the cathode. To mitigate uneven wear of the electrodes, some electrolytic sanitation systems reverse the polarities of the electrodes at set time intervals. However, such polarity reversal still does not result in the most efficient use of the electrodes, where both electrodes wear at substantially the same rate.

Sanitation systems also typically require replacement of working parts, such as the electrodes, by trained technicians, making replacement of parts inconvenient and costly for the user.

There remains a need for a sanitation system capable of extending the life of its components and allowing for maintenance by the user, thus reducing the need for trained service personnel and frequency of service.

SUMMARY

Systems and methods for an improved water sanitation system for hot tubs, spas, and the like are provided. Embodiments of a sanitation system disclosed herein are capable of operating without the pump or water circulation of the spa running, and are capable of selectably operating electrodes of the system in different polarity configurations according to the impedance of the electrodes to extend the life of the electrodes. The life of electrodes is further extended by maintaining voltage and current parameters within optimal ranges and the use of "soft starts". The sanitation system is also configured to monitor the total charge delivered to the electrodes of the system to provide a more accurate measurement of the remaining life of the electrodes. Further, the electrodes are user replaceable for ease of maintenance.

In one aspect, a spa sanitation system is provided having two or more electrodes, an oxidation reduction (ORP) sensor, a pH sensor, a temperature sensor, a power source, and a controller. The two or more electrodes forming a first group of electrodes and a second group of electrodes. The controller being operatively connected to the power source, pH sensor, temperature sensor, power sensor, and the two or more electrodes. The controller being configured to determine a voltage and a current to be delivered to the two or more electrodes, determine a time period for which to run the two or more electrodes, and select a polarity configuration of the two or more electrodes. Where the polarity configuration is selected from a first polarity where the first group of electrodes act as anodes and the second group of electrodes act as cathodes, or a second polarity where the first group of electrodes act as cathodes and the second group of electrodes act as anodes, and where the controller selects the polarity configuration based on a first wear and a second wear of the two or more electrodes.

In an embodiment, the controller of the spa sanitation system calculates the first wear based on a first measured impedance of the two or more electrodes in the first polarity, and the second wear based on a second measured impedance of the two or more electrodes in the second polarity.

In an embodiment, the controller of the spa sanitation system is configured to monitor the cumulative charge delivered to the two or more electrodes in each of the first and second polarities.

In an embodiment, the controller of the spa sanitation system operates according to a plurality of operational cycles, and the steps of determining the voltage and current, determining the time period, and selecting a polarity configuration are performed for each operational cycle of the plurality of operational cycles.

In an embodiment, the controller of the spa sanitation system is configured to reverse the polarity configuration of the two or more electrodes if it is detected that the same polarity configuration was selected for a threshold number of consecutive operational cycles.

In an embodiment, the two or more electrodes are located adjacent a side wall of the vessel.

In an embodiment, the spa sanitation system has a module configured to deliver controlled injections of an adjust down chemical to lower a pH level of the water.

In an embodiment, the electrodes are contained in a user replaceable housing.

In an embodiment, the spa sanitation system has a sacrificial anode.

In an embodiment, the spa sanitation system has a salinity sensor.

In an embodiment, the spa sanitation system has a chlorine sensor.

In an embodiment, the spa sanitation system has a turbidity sensor.

In an embodiment, the two or more electrodes are 5-plate electrodes.

In another aspect, a method is provided for controlling a spa sanitation system of a water-containing vessel, the method comprising acquiring ORP measurements, pH measurements, and temperature measurements for the water, determining a voltage and a current to be delivered to two or more electrodes of the spa sanitation system to produce sufficient sanitizer, determining a time period for which to run the two or more electrodes, and selecting a polarity configuration of the two or more electrodes, wherein the polarity configuration comprises at least a first polarity and a second polarity.

In an embodiment, the method further comprises turning off pumps of the vessel.

In an embodiment, the step of the method of selecting a polarity configuration comprises measuring a first impedance of the two or more electrodes in a first polarity and measuring a second impedance of the two or more electrodes in a second polarity, and selecting the polarity configuration having a lower impedance.

In an embodiment, the steps of the method of turning off the pumps, acquiring ORP measurements, pH measurements, and temperature measurements, determining the voltage and the current, determining the time period, and selecting the polarity configuration are performed in an operational cycle of a plurality of operational cycles.

In an embodiment, the method includes periodically switching the polarity configuration if the same polarity configuration was selected for a threshold number of consecutive operational cycles.

In an embodiment, the method includes monitoring a cumulative charge delivered to the two or more electrodes in each of the first polarity and the second polarity.

In an embodiment, the method includes injecting a pH adjust down chemical into the water if the pH measurements are above a maximum pH threshold.

In an embodiment, the voltage delivered to the two or more electrodes is increased from zero to the determined voltage gradually over a ramp period.

BRIEF DESCRIPTION OF THE DRAWINGS

FIG. 6A is a side elevation view of an embodiment of an electrolytic cell coupled to an adapter for integration with a spa sanitation system;

FIG. 6B is a cross-sectional side elevation view of the electrolytic cell of FIG. 6A cut along the line B-B;

DETAILED DESCRIPTION OF THE EMBODIMENTS

Although a few embodiments have been shown and described, it will be appreciated by those skilled in the art that various changes and modifications can be made to these embodiments without changing or departing from their scope, intent, or functionality. The terms and expressions used in the preceding specification have been used herein as terms of description and not of limitation, and there is no intention in the use of such terms and expressions of excluding equivalents of the features shown and described or portions thereof.

Figure 1A:
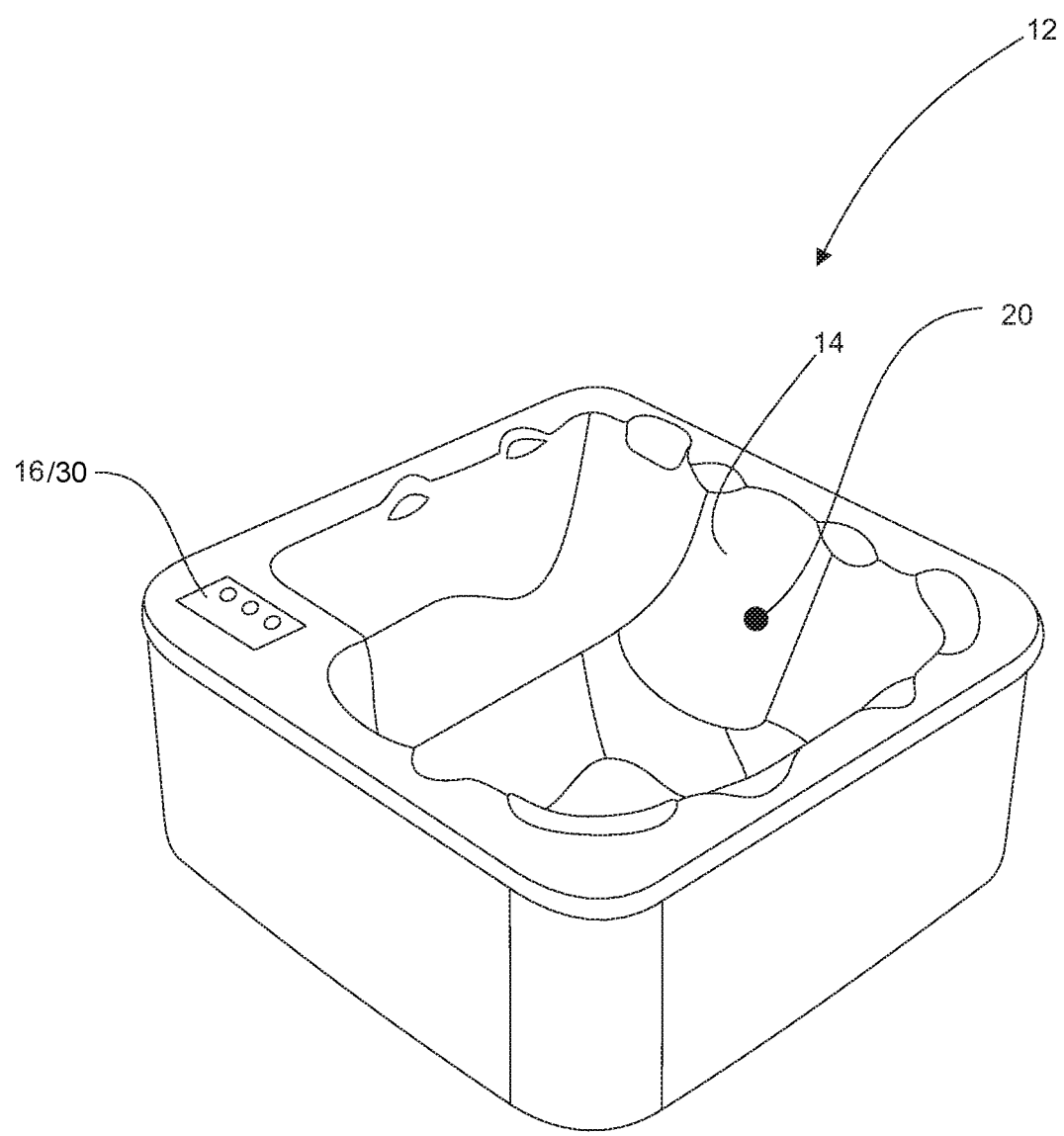
FIG. 1A is a perspective view of a spa in which embodiments of the sanitation system may be used.
Figure 1B:
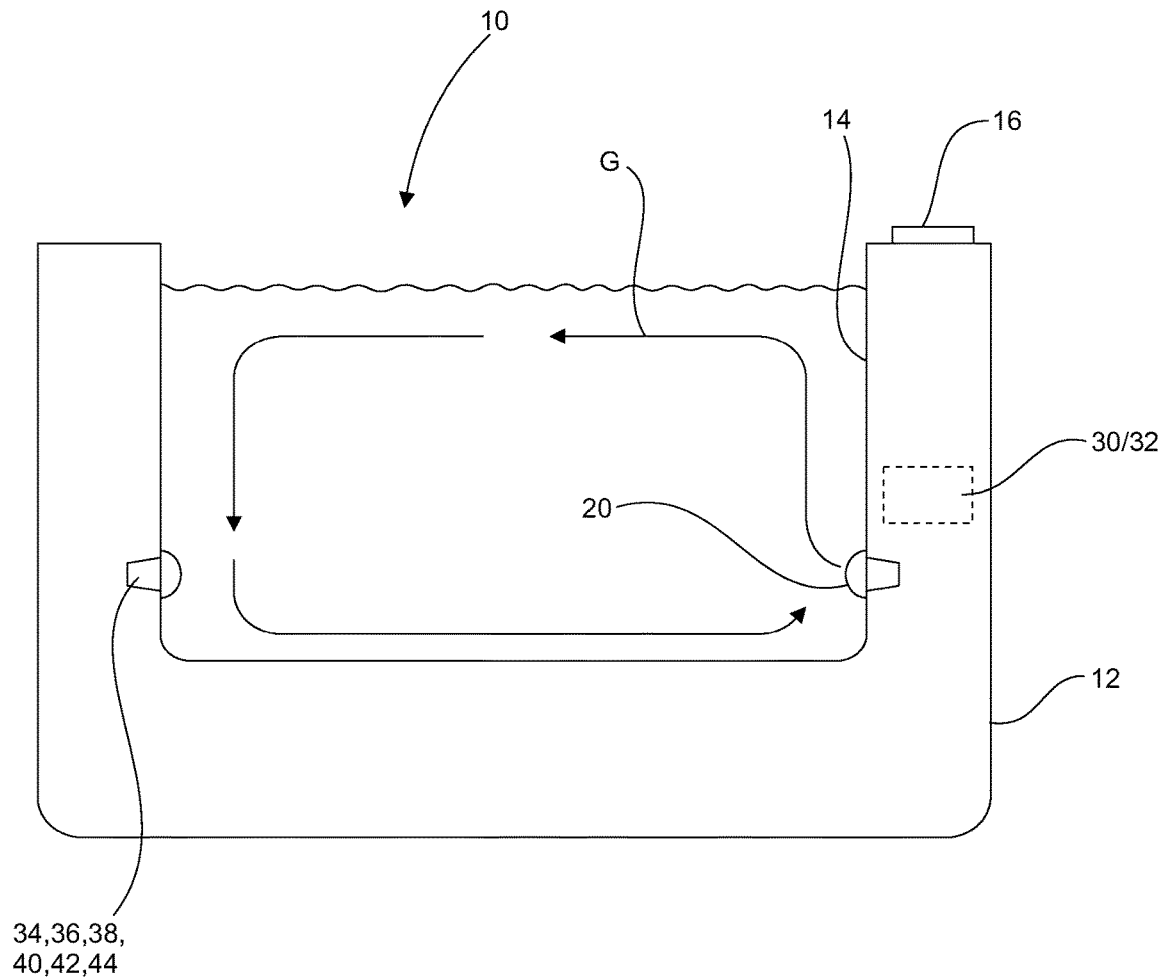
FIG. 1B is a cross-sectional view of a spa in which embodiments of the sanitation system may be used.
Figure 2B:
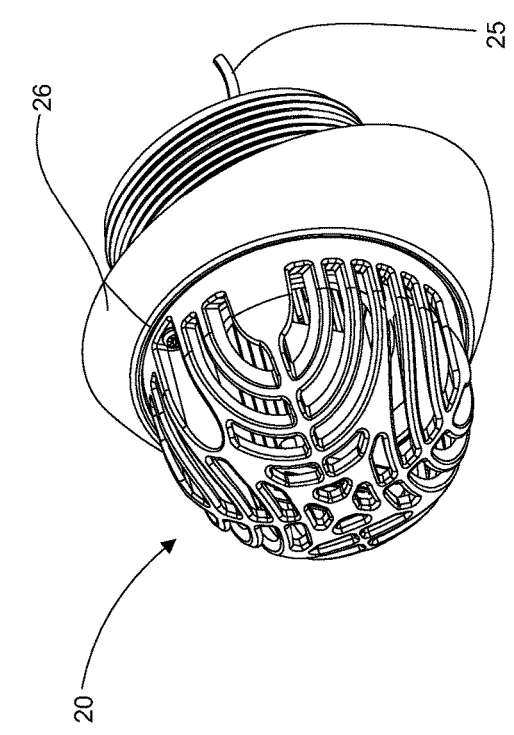
FIG. 2B is a perspective view of the electrolytic cell of FIG. 2A.
Figure 2D:
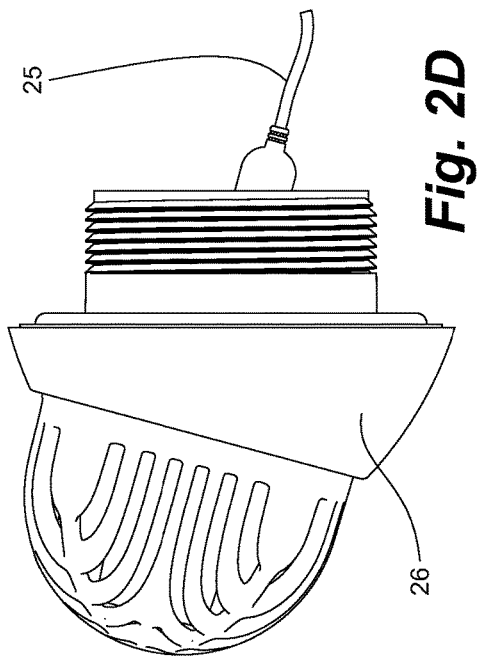
FIG. 2D is a side elevation view of the electrolytic cell of FIG. 2A.
Figure 2A:
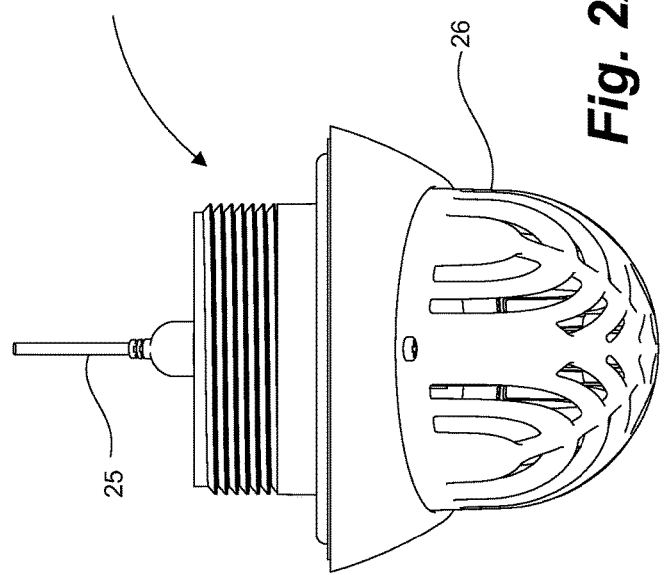
FIG. 2A is a front elevation view of an embodiment of an electrolytic cell for use in a water sanitation system.
Figure 2C:
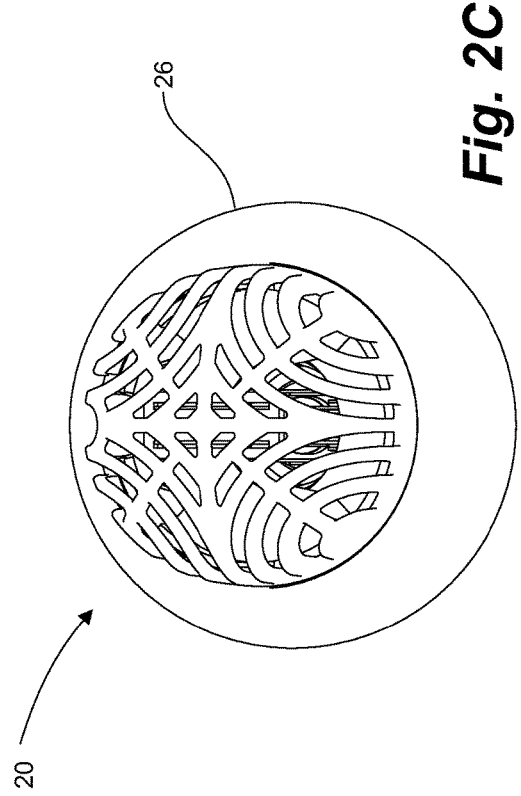
FIG. 2C is a top plan view of the electrolytic cell of FIG. 2A.
Figures 3A, 3B:
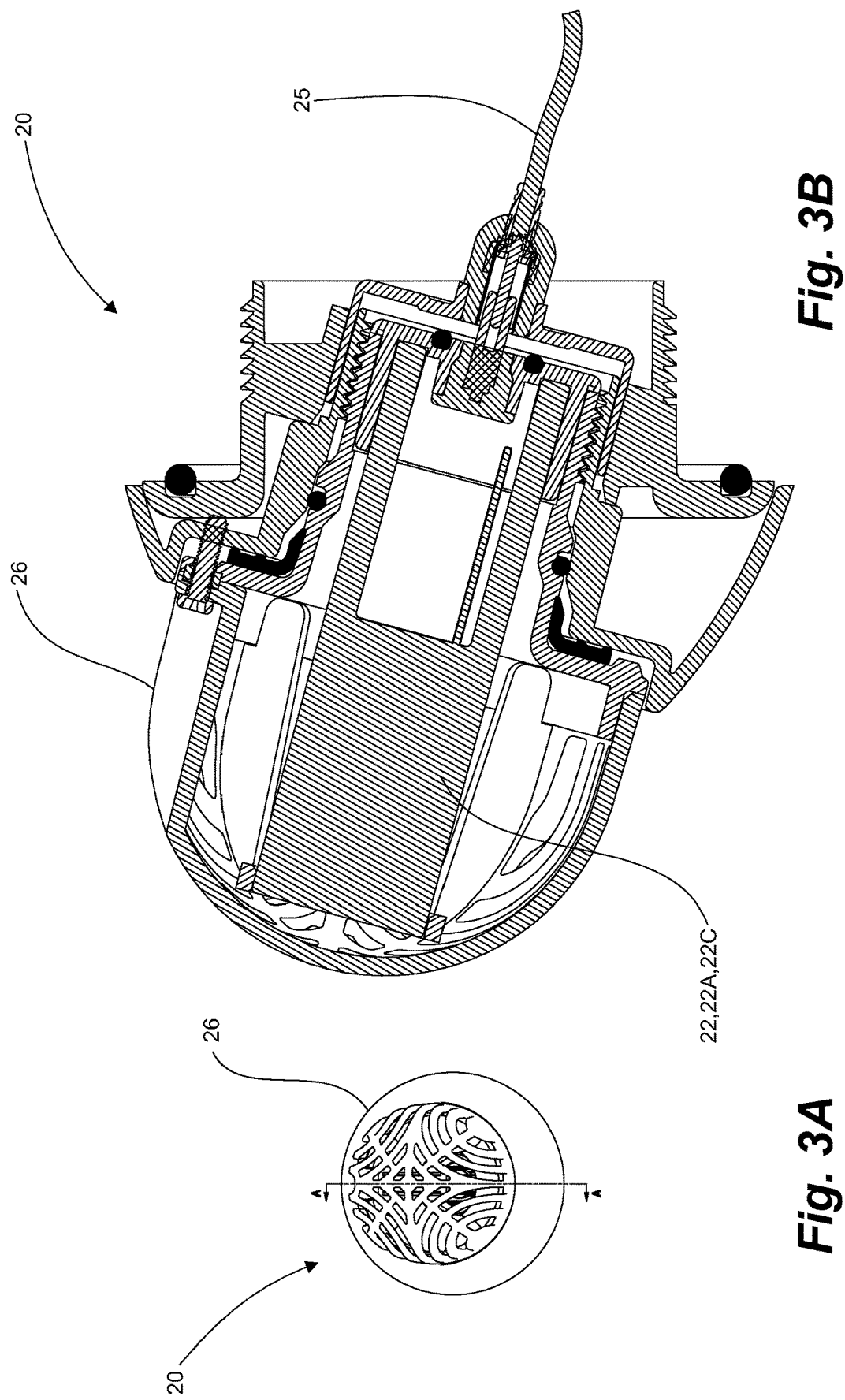
FIG. 3A is a top plan view of the electrolytic cell of FIG. 2A.
FIG. 3B is a cross-sectional side view of the electrolytic cell of FIG. 3A cut along the line A-A.
Figure 4:
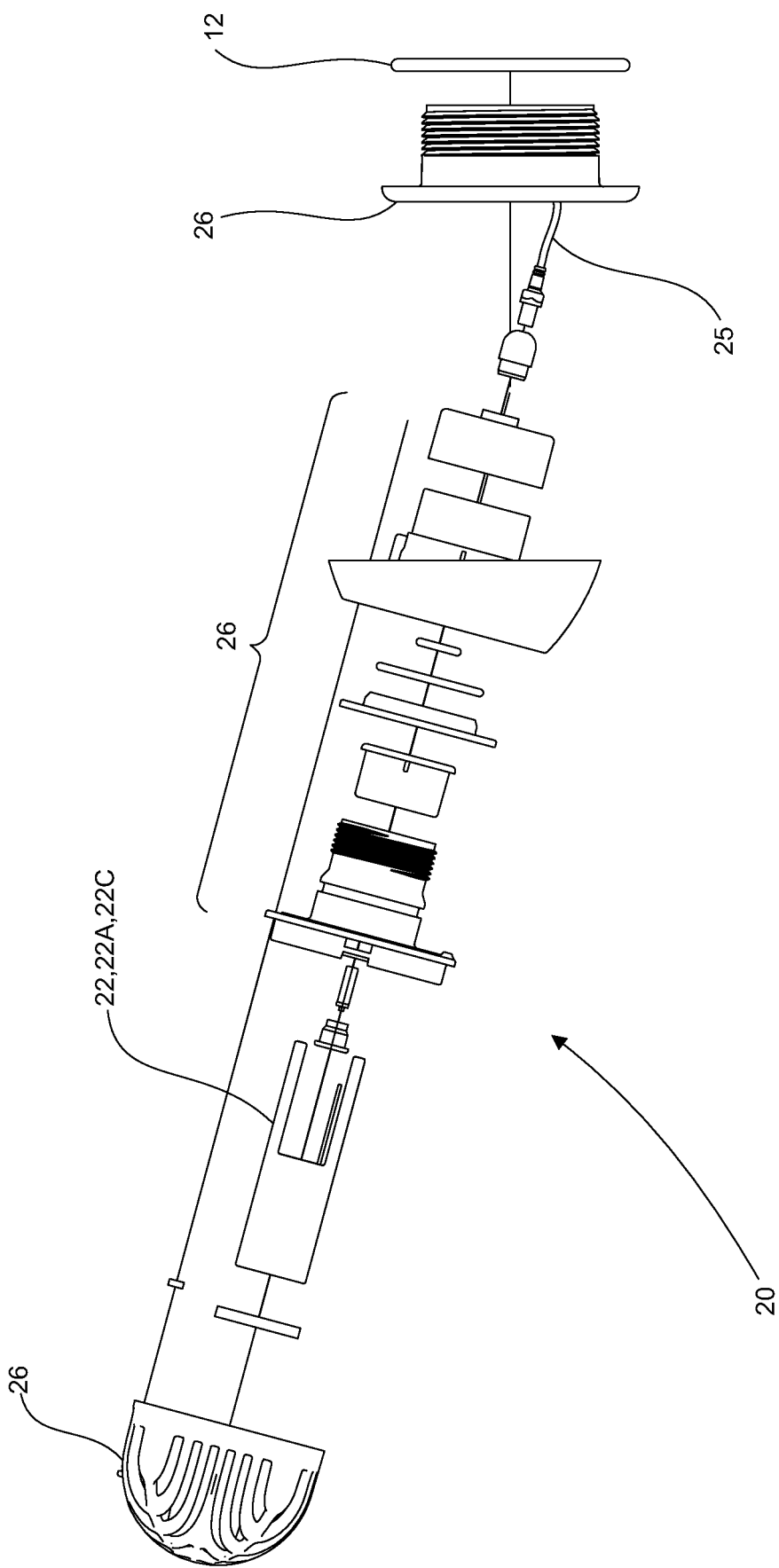
FIG. 4 is an exploded side view of the electrolytic cell of FIG. 3A.

Referring to FIGS. 1A and 1B, embodiments of a water sanitation system 10 herein comprise at least two electrodes 22, each capable of operating as an anode 22A or a cathode 22C, coupled with a controller 30 which operates in a manner to extend the life of the electrodes 22 by selecting which of the electrodes 22 is designated an anode 22A and a cathode 22C based on relative wear of the electrodes 22. The electrodes 22 may be contained within a housing 26 and forming part of an electrolytic cell 20 for easier handling.

Referring to FIGS. 1A to 8C, embodiments herein of the water sanitation system 10 are described with reference to a spa or hot tub 12. However, the water sanitation system 10 described herein may be used with any suitable body of water, including spas, hot tubs, swim spas and cold tubs.

Figure 9C:
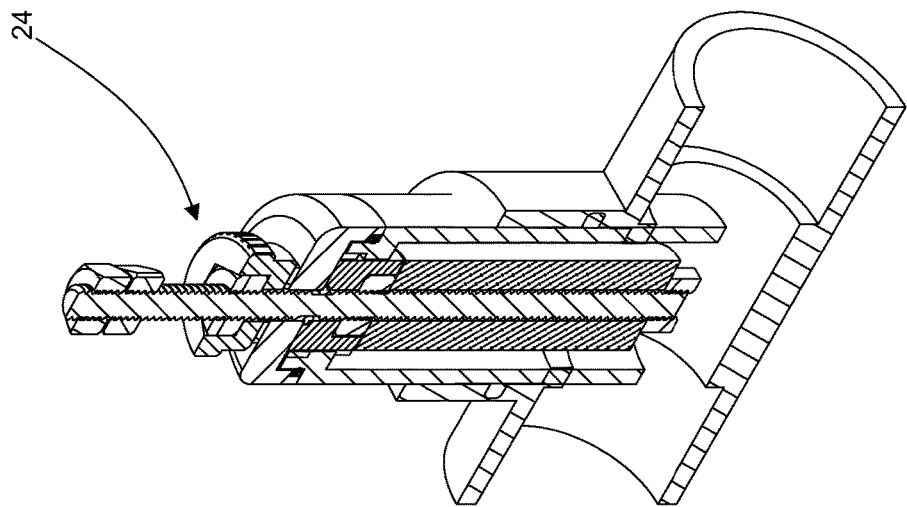
FIG. 9C is a cross-sectional perspective view of the sacrificial anode of FIG. 9A.
Figure 9B:
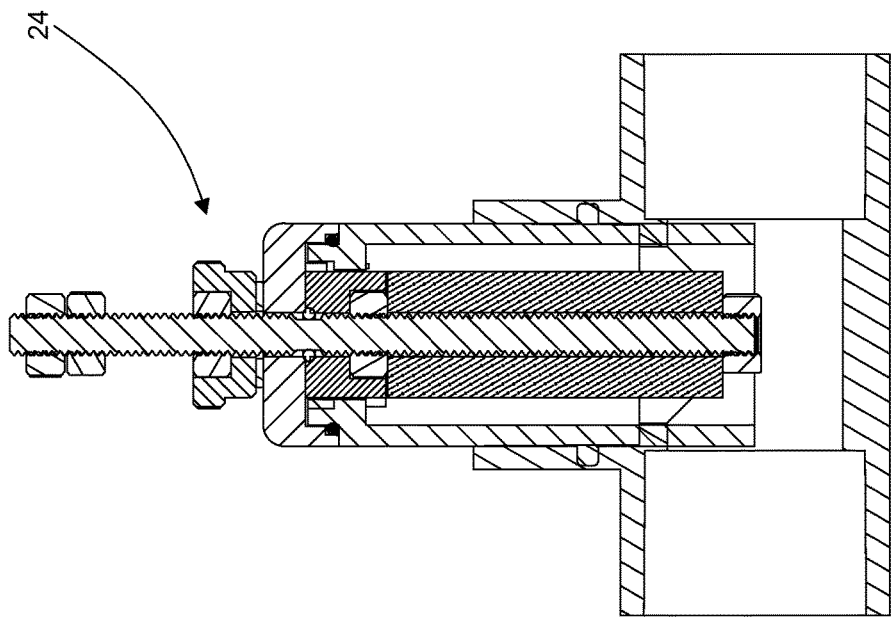
FIG. 9B is a cross-sectional side view of the sacrificial anode of FIG. 9A.
Figure 9A:
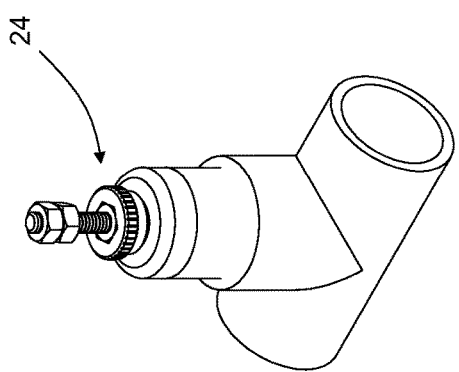
FIG. 9A is a perspective view of an embodiment of a sacrificial anode for use in a water sanitation system.

In an embodiment, the water sanitation system 10 comprises the electrolytic cell 20 having two or more electrodes 22, a power source 32, a controller 30, an ORP measurement sensor 40, a pH measurement sensor 42, a temperature sensor 44, and a module for delivering an "adjust down" chemical. In the embodiments, the "adjust down" chemical can be muriatic acid, carbon dioxide, sodium bisulfate, vinegar, or another suitable chemical for adjusting pH. The cell 20 can be electrically connected to the controller 30 and/or power source 32 via an electrical cord 25 extending therebetween. In embodiments, the ORP measurement sensor 40, the pH measurement sensor 42 and the temperature sensor 44 may have common components and be housed together. In other embodiments, the sensors 40, 42, 44 may be housed separated and/or located apart from each other. In an embodiment, the power source 32 and controller 30 for the sanitation system 10 can be located near the spa control module 16 of the spa or hot tub 12, the electrolytic cell 20 can be attached to a side wall 14 of the spa or hot tub 12, and the ORP measurement sensor 40, pH measurement sensor 42, and temperature sensor 44 can be installed near the electrolytic cell 20 or at another suitable location in the spa or hot tub 12. In other embodiments, the controller 30 can be integrated into the control module 16 of the spa. Referring to FIGS. 9A to 9C, in embodiments where a sacrificial anode 24 is included, the sacrificial anode 24 can be installed any location where it is in contact with the water. In embodiments, the sacrificial anode 24 is installed in a drain line near the equipment compartment for inspection, and away from the water flow, with a ground cable run to the ground circuit of the spa or hot tub 12 electrical system. In embodiments, the sanitation system 10 can comprise a turbidity sensor 38, which is a high definition sensor that measures water clarity. In embodiments, the turbidity sensor 38 can signal to the sanitation system 10 that sanitizer is required to remedy low water clarity. The above components of the sanitation system 10 can be connected with wired or wireless means, such as cords wires, radio-frequency, Bluetooth, and the like.

During the electrolytic sanitation process, electrical current passing between the anode 22A and the cathode 22C in the spa water causes salt molecules in the water to split into sodium and chlorine ions. As seen in FIG. 1B, the ions created by the electrolytic process appear as gas bubbles G in the water. By locating the electrolytic cell 20 under the surface of the water attached to a side wall 14 of the spa 12, the water sanitation system 10 uses the natural flow caused by the escaping gas G allowing it to circulate water without a pump, thus saving energy.

Figure 10:
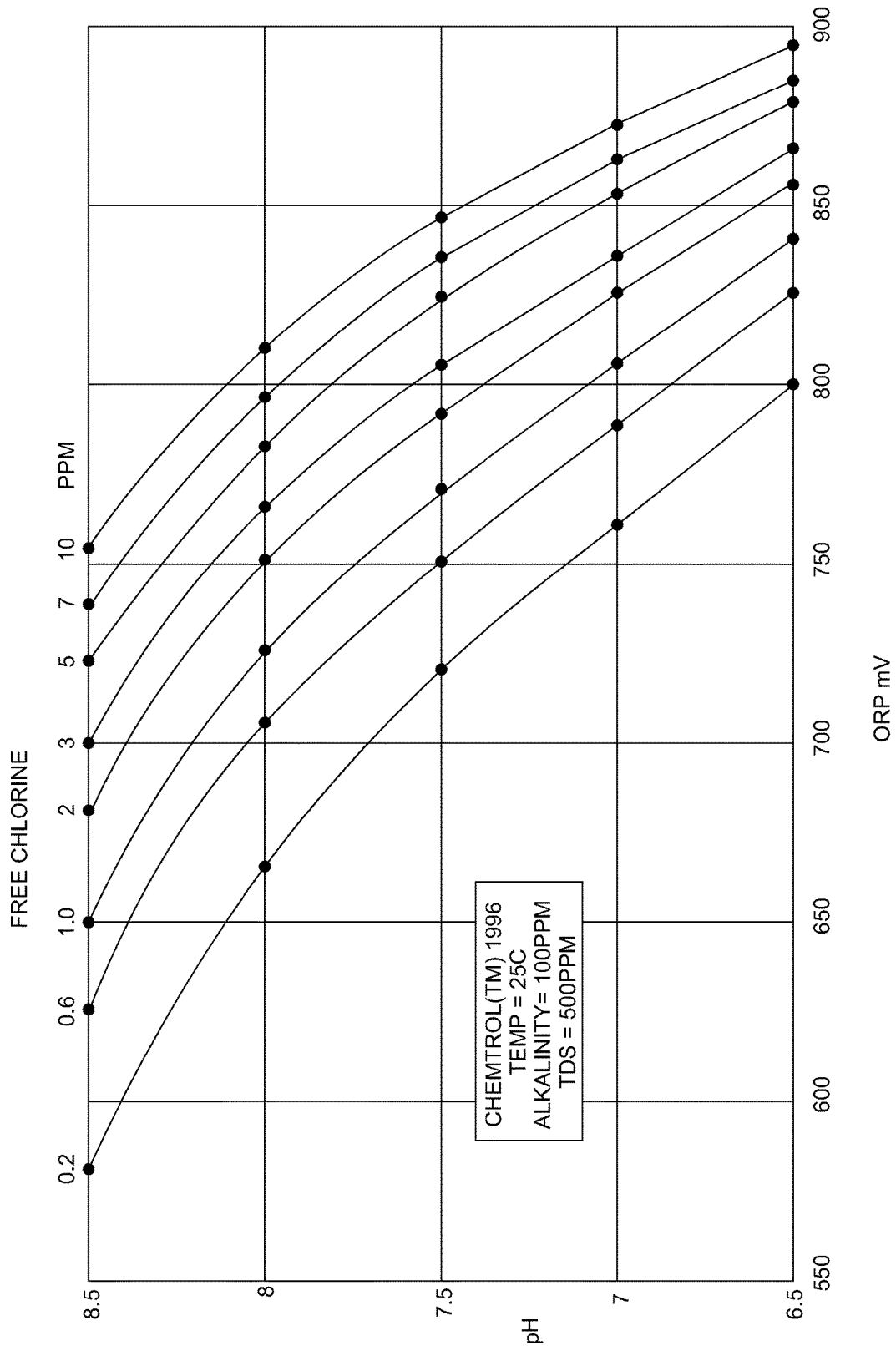
FIG. 10 is a graph illustrating an estimation of free chlorine based on pH and ORP measurements at a given temperature.

The water sanitation system 10 can estimate the free chlorine (FCL) level of the spa water using Oxidation Reduction Potential (ORP), pH, and temperature measurements obtained from the ORP sensor 40, the pH sensor 42, and the temperature sensor 44 of the water sanitation system 10, respectively. With reference to FIG. 10, the FCL of the water can be calculated from measured pH, ORP, and temperature using known correlation data. The FCL can then be used to determine whether current must be passed between the electrodes 22 to generate additional chlorine, and how much chlorine must be generated. As FCL can be estimated from the ORP, pH, and temperature of the water, the water sanitation system 10 does not require a separate chlorine sensor, which has the advantage of reduced cost and not requiring an additional component that may be subject to failure. Further, ORP is a more useful measurement for the cleanliness of water than FCL, as a chlorine sensor would only work where chlorine is the sanitizer used. In contrast, ORP measures the oxygen content in water and its ability to break down contaminants through oxidation, and as such is suitable for use with a wide variety of sanitizers. In embodiments, the ORP measurement sensor 40 is configured to at least measure known chemical substances, including FCL. In embodiments, the sanitation system 10 may comprise a separate chlorine sensor 36.

As the water sanitation system 10 requires sufficient salt in the spa water to generate chlorine therefrom, the water sanitation system 10 monitors the salt level in the spa water using a salt estimation algorithm based on measurements of electrode 22 impedance and wear, and can prompt the user to add salt if needed. The salt estimation algorithm is based on the measured impedance of the electrodes 22 as salt is added to the water. In an embodiment, the operational range of salt concentration in the water is between 800 p.p.m and 3000 p.p.m. Such impedance measurements can be taken using electrodes 22 at various stages of wear, for example, using new electrodes 22, 25% worn electrodes 22, 50% worn electrodes 22 and 75% worn electrodes 22. Electrode 22 wear is determined based on the accumulated charge of the electrode 22, which can be measured in milliamp-hours (mA), as described in further detail below. The salt estimation algorithm uses linear interpolation between known points based on such impedance measurements to estimate salt level. More specifically, the impedance of the electrode 22 at known wear and salinity levels can be compared with the actual measured impedance and current wear of the electrodes 22 to estimate the salinity of the water. Thus, the water sanitation system 10 is controlled to maintain measurements within acceptable levels to provide accurate estimations of FCL in the water. In embodiments, the sanitation system 10 may comprise a separate salinity sensor 34 for directly measuring salt concentration.

The controller 30 of the water sanitation system 10 controls the operation of the electrodes 22 based on the ORP, pH, and temperature measurements obtained by the various sensors 40, 42, 44 of the water sanitation system 10. The controller 30 can be configured to operate the electrodes 22 to maintain ORP at about a selected set point, for example 740 mV, or within a selected range, for example +/−20 mV. In an embodiment, the ORP level can be maintained at three different levels based on user settings: 450-550 mV, 550-650 mV and 650-750 mV. In embodiments, the pH can be maintained at levels between 6.8 and 7.2 and the temperature can be maintained between 42 to 107 degrees Fahrenheit. The speed at which the electrolytic process occurs is controlled by the controller 30 by adjusting the current through the electrodes 22. The controller 30 can also be configured to inject a pH-reducing "adjust down" chemical to maintain the pH of the spa water within a range appropriate for spa occupants, for example between 7.2 and 7.8.

Figure 11:
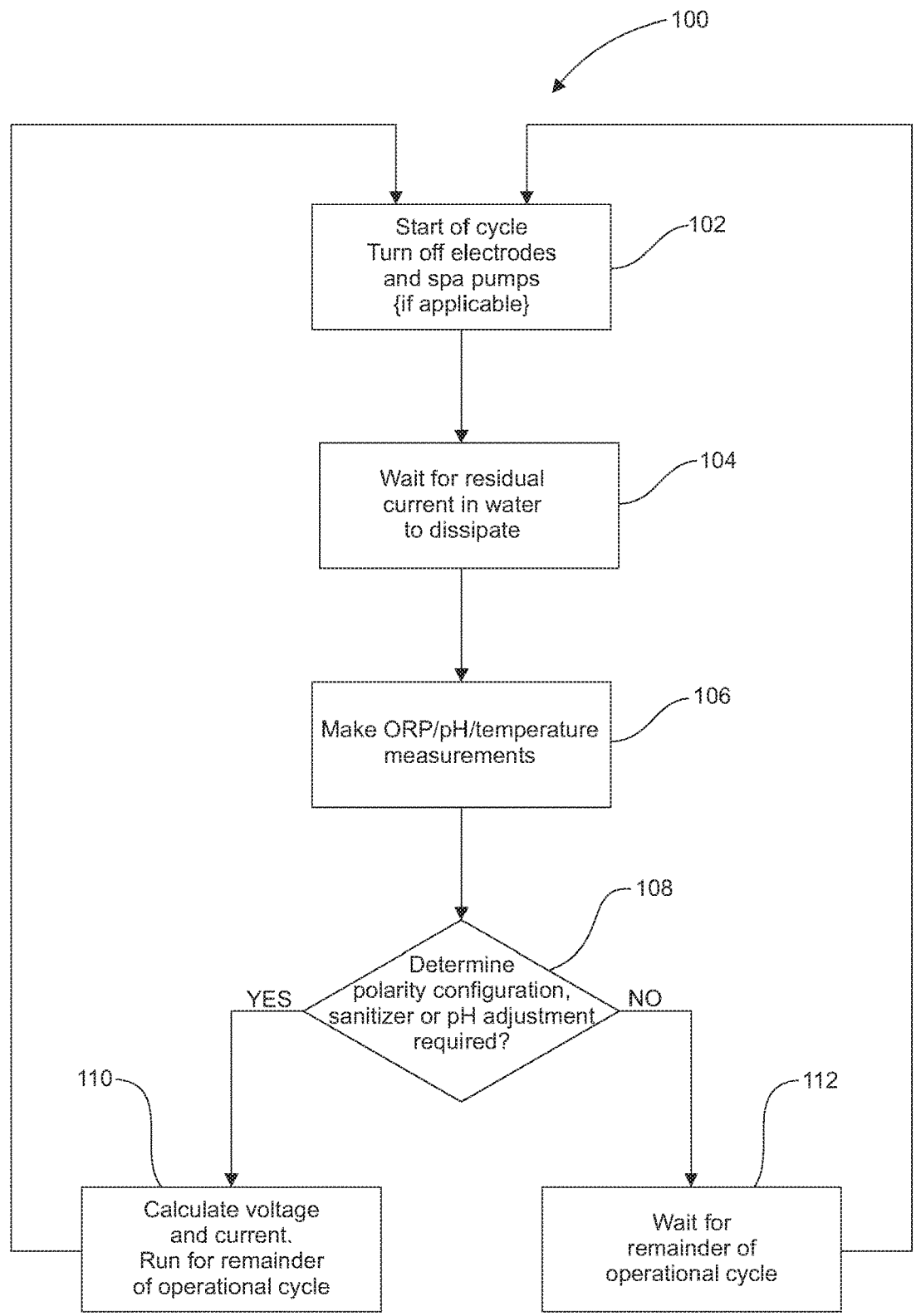
FIG. 11 is a state machine diagram illustrating the operation of an embodiment the spa sanitation system.

The controller 30 of the water sanitation system 10 can be configured to operate in a series of operational cycles. An exemplary operational cycle 100 is depicted in FIG. 11. At the beginning of the operational cycle 100, at step 102, the electrodes 22 as well as the pumps of the spa 12, if present, are turned off. At step 104, the controller 30 then waits for residual electrical current in the water from a previous operational cycle to dissipate, for example by waiting for one minute or some other time period. At step 106, the controller 30 takes ORP, pH, and temperature measurements using the respective sensors 40, 42, 44. Based on the ORP, pH, and temperature measurements, at step 108, the controller 30 determines whether sanitizer needs to be produced to adjust the ORP, or whether the pH must be adjusted, in the present cycle. If sanitizer needs to be produced, the controller 30 also determines how much sanitizer should be produced, the voltage and current needed to produce the requisite amount of sanitizer, and what polarity the electrodes 22 should be operated in. As discussed in further detail below, the controller 30 selects the polarity of the electrodes 22 based on the relative wear of the electrodes 22 determined by impedance. Likewise, if pH must be adjusted, the controller 30 can introduce an appropriate amount of pH adjust-down chemical into the water during the operational cycle to bring the pH to a desired level. The controller 30 then either runs the sanitization procedure for the remainder of the operational cycle (step 110) or, if no sanitizer needs to be produced, waits until the next operational cycle and the process repeats (step 112). In an embodiment, an operational cycle can be 10 minutes. However, in other embodiments, a different operational period can be selected.

Figure 12:
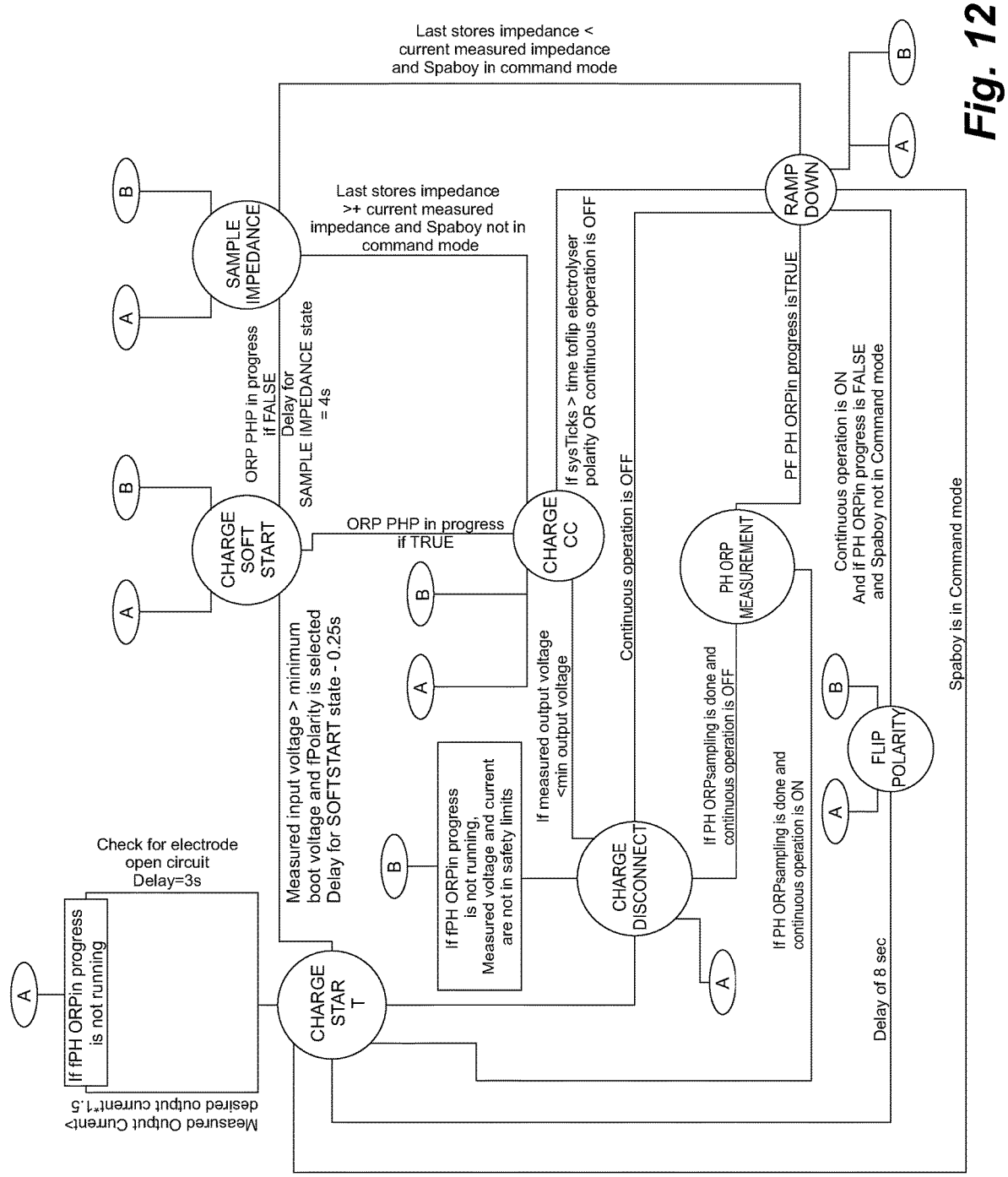
FIG. 12 is an example state machine diagram illustrating the operation of the electrodes of an embodiment of the sanitation system.

FIG. 12 is a state machine diagram illustrating on embodiment of the operation of the electrodes in the sanitation system, which illustrates the following states and the transitions therebetween: ORP not charging, charge starting, soft start charging, sampling impedance, charging, disconnecting from charging state, ORP measurement, flipping polarity of electrodes, ramping down charging.

In embodiments, the controller 30 can adjust the ORP level to an ORP setpoint, the setpoint being a target value or targeted range, using hysteresis around the setpoint value. For example, if the ORP setpoint is 740 mV, the controller 30 can be configured to operate the electrodes 22 to produce sanitizer when the ORP drops to 720 mV or below, and can continue operating until the measured ORP reaches 760 mV. The deadband around the ORP setpoint can be selected to maintain the ORP of the spa water within a range in which FCL is most effective, and within the limits of the FCL estimation algorithm. For example, for the 740 mV setpoint, the deadband is the range between 720 mV and 760 mV. In embodiments, a different setpoint and/or a different deadband thereabout can be selected.

Applicant has found that at a current of about 980 mA, the electrodes 22 have a long life but will only maintain water in a sanitary condition if no new bacteria or organics are introduced into the water. Applicant has further found that about 2400 mA is ideal for effective sanitizer production in a non-sanitary environment. In an embodiment, the controller 30 can be configured to operate to deliver between 980 mA and 2400 mA of current depending on how much sanitizer is required based on the water conditions. For example, the controller 30 could operate to deliver 2400 mA to the electrodes 22 for a period to bring the FCL of the water to a desired level, and then deliver 980 mA to maintain the FCL level. The controller 30 can also be configured to deliver any other level of current within the operating range to the electrodes 22. In embodiments, the controller 30 can be configured to deliver current within a different operating range.

The electrolytic process causes wear on the electrodes 22 and increases the impedance thereof. Eventually, the impedance of the electrodes 22 increases to a point where the power source 32 can no longer provide a current sufficient to carry out the electrolytic reaction or generate FCL at a sufficient rate, and the electrode plates 22 become unusable and require replacement. Therefore, wear of the electrodes 22 can usually be measured by calculating impedance during operation of the electrodes 22 from the known voltage required to drive the electrodes 22 to provide the desired current. For example, if 5 VDC is required to deliver 2400 mA to the electrodes 22, then using Ohm's law, the impedance of the electrodes 22 is 2.080.

As mentioned above, each of the electrodes 22 of the present water sanitation system 10 is capable of being designated as either an anode 22A or a cathode 22C, such that current can flow between the electrodes 22 in either direction. At the beginning of each operational cycle, the controller 30 decides, based on the relative wear of the electrodes 22 determined by impedance, which direction the current should flow. This is done by taking a reading of impedance in each polarity configuration and using the polarity configuration with the lower measured impedance, as less cumulative wear has occurred in that direction.

Applicant has found that electrodes 22 wear at different rates, and simply reversing the polarity at regular time intervals, while reducing electrode wear to a degree, does not maximize the life of the electrodes 22. For example, when polarity is reversed at regular time intervals, it was found that nearly all of the electrodes 22 had one side worn more than the other. Applicant has found that more efficient use of the electrodes 22 is achieved when the impedance of the electrodes 22 is measured in each polarity, and the polarity of the electrodes 22 is switched based on relative wear of the electrodes 22 such that the polarity with lower impedance (indicating less wear) is used. When the relative impedance of a first polarity currently used by the water sanitation system 10 becomes higher than a second, opposite polarity, such as by a minimum threshold difference, the controller 30 can operate the water sanitation system 10 in the second polarity and vice versa. The controller 30 can be configured to continue to switch the polarities of the electrodes 22 in this manner such that the electrodes 22 wear evenly in both polarities. The impedance of the electrodes 22 can be measured at the beginning of each operational cycle, during the operation of the electrodes 22, or at any other point during the operation of the sanitation system 10.

In an exemplary embodiment, the water sanitation system 10 is configured to supply 0 to 2400 mA of current to the electrodes 22, and is capable of providing 3 to 13.5 VDC of voltage thereto. A new electrode 22 can require about 5.5 VDC to draw 2400 mA. As the electrode 22 wears and its impedance increases, the voltage required to draw 2400 mA also increases until the maximum 13.5 VDC is supplied to the electrodes 22. From this point on, as the electrodes 22 continue to wear, the current drawn will drop until it reaches 0 mA.

The controller 30 can further be configured to prompt the user to change the electrodes 22 as they approach the end of their usable life. The water sanitation system 10 can have a user interface, for example in the control module 16 of the spa 12, showing the estimated life remaining in the electrodes 22 indicated as a percentage as well as allowing the user to select the level of FCL desired as either low (e.g. 450-550 mV), medium (e.g. 550-650 mV) or high (e.g. 650-750 mV). For example, an electrode life indicator can illuminate a green light until the maximum available voltage is applied to the electrodes. Once maximum voltage is reached, the electrode life indicator illuminates a yellow light until the maximum current that can be drawn falls down to 1000 mA, at which point the indicator illuminates a red light to indicate that little chlorine is being produce by the electrodes 22.

As water composition in different geographic regions of the spa can vary, the water sanitation system's 10 activity will also vary accordingly. Thus, estimating the remaining life of an electrode 22 using time-since-installation or an hour meter may not provide accurate results. Thus, the controller 30 can also be configured to maintain a charge counter that logs the cumulative charge delivered to each electrode 22 in each polarity configuration, measured in milliamp hours (mAh). This information allows a more accurate determination of the remaining life of the electrodes 22, as tracking the cumulative charge delivered in each polarity takes into account not only how long an electrode 22 is run, but the intensity of operation as well. In such embodiments, the electrode life indicator can display electrode life based on the accumulated mAh of the electrode 22 in each polarity direction and a predetermined lifespan of the electrode 22 in each polarity.

In embodiments, the water sanitation system 10 can also include a light emitting diode for displaying what state the controller 30 is in. In addition to the charge counter described above, the water sanitation system 10 can also keep a record of pH, ORP, voltage, current, impedance, and temperature readings. The water sanitation system 10 can further include an internet communications interface that allows staff at spa dealers and factories as well as other technicians to access this information for diagnostic purposes.

When the polarity of the electrodes 22 is maintained in one configuration for an extended period of time, the electrodes 22 will develop a buildup of "scale" comprising calcium and other minerals. The scale can be shed by reversing the polarity of the electrodes 22 for an operational cycle. In embodiments, such polarity reversal can be selected by the controller 30 even if reversing the polarity would result in operating the sanitation system 10 in a polarity with higher wear. In an embodiment, the water sanitation system 10 can reverse the polarity of the electrodes 22 at regular intervals, for example every eight operational cycles. In embodiments, the controller 30 can be configured to reverse the polarity of the electrodes 22 if it is detected that the electrodes 22 were operated in the same polarity for a threshold number of consecutive operational cycles, such as eight consecutive cycles.

The life of the electrodes 22 can be further extended by using a "soft start" at the beginning of each operational cycle. This process involves gradually ramping up the voltage and/or current to the electrodes 22 when the electrolytic process begins during an operational cycle. For example, the voltage or current through the electrodes 22 can increase from zero to the selected voltage or current in about 5 seconds. Other ramp periods besides 5 seconds may be used. In embodiments, one of the current or voltage to the electrodes 22 can be fixed while the other parameter is controlled and ramped up. Applicant found that using a soft start can extend the life of the electrodes 22 by about 10% or more.

The controller 30 of the water sanitation system 10 can also be interfaced with the controller module of the spa or hot tub 12 such that it can control the pumps thereof (if present). As water movement affects the accuracy of ORP measurements, in embodiments, the controller 30 can be configured to direct the controller module of the spa 12 to turn off the pumps each time ORP measurements are taken to ensure the accuracy of such measurements, such as at step 102 of the exemplary operational cycle 100.

To mitigate corrosion of the electrodes 22, the water sanitation system 10 can also incorporate a sacrificial anode 24, for example installed in a drain line near the equipment compartment for inspection, and away from the water flow, with a ground cable run to the ground circuit of the spa or hot tub electrical system. The sacrificial anode 24 is made of a metal alloy more active than the electrodes 22 it is protecting. In embodiments, the sacrificial anode 24 is comprised of zinc.

Figure 5:
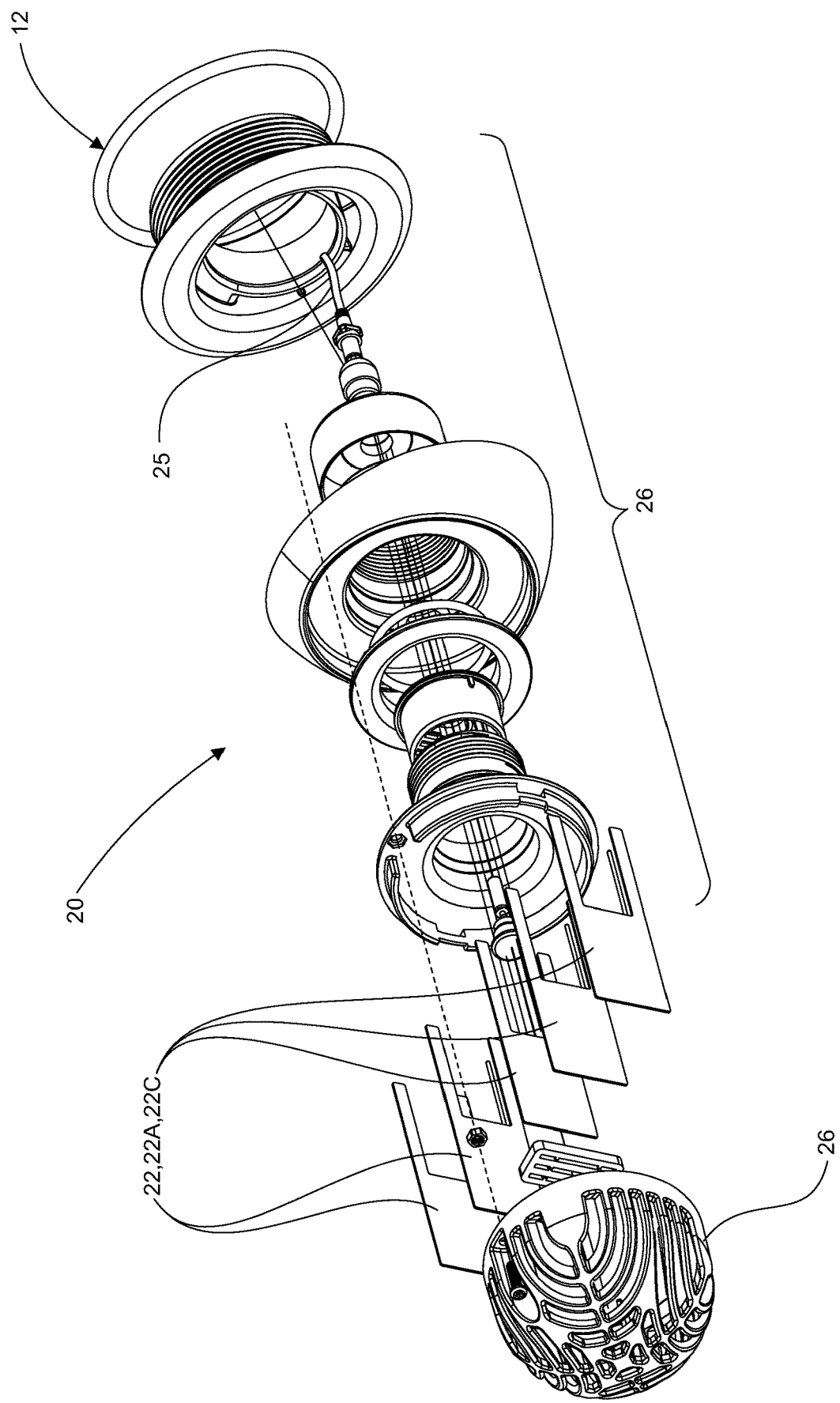
FIG. 5 is an exploded perspective view of the electrolytic cell of FIG. 3A.
Figure 7:
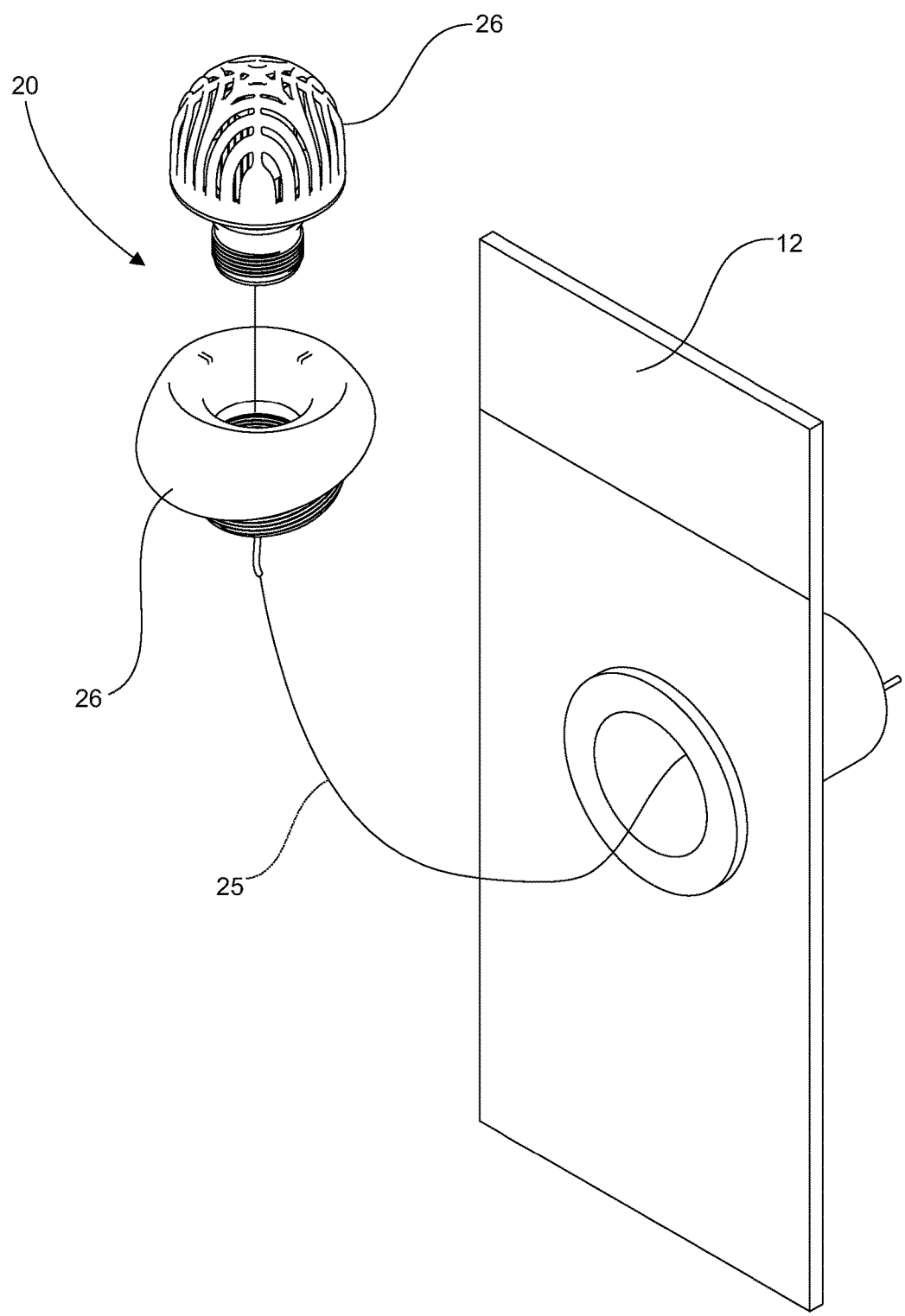
FIG. 7 is a diagram showing how an electrolytic cell can be installed in an for mounting in a section of a spa or hot tub.
Figure 8A:
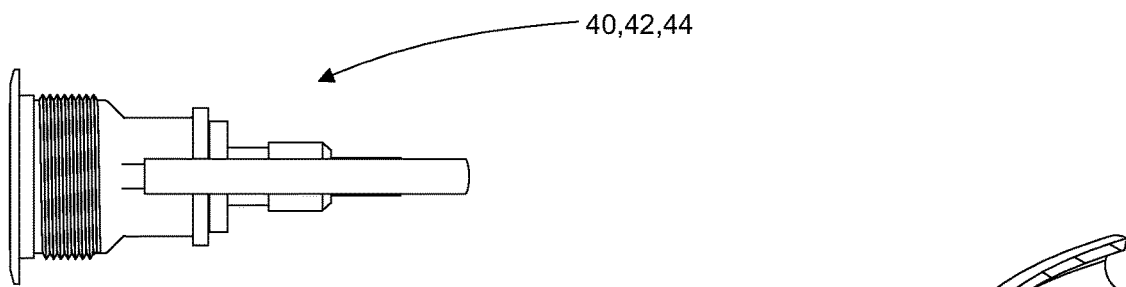
FIG. 8A is a side elevation view of an ORP sensor for use in a water sanitation system.
Figure 8B:
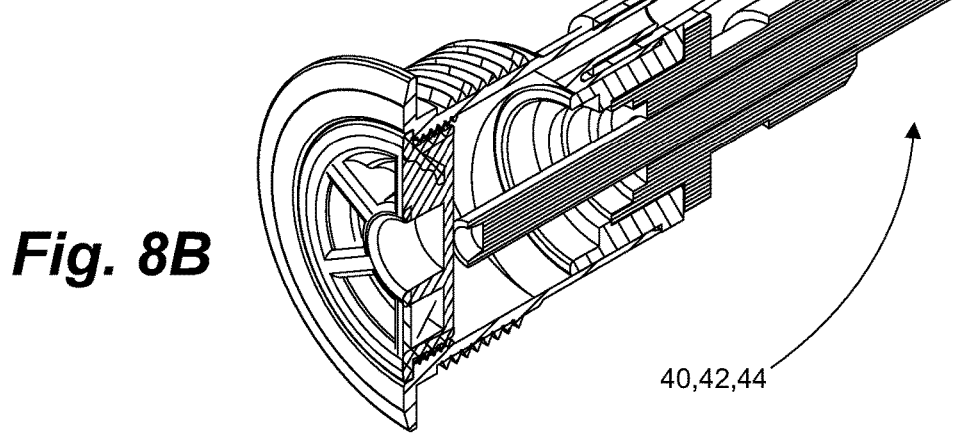
FIG. 8B is a side cross-sectional view of the ORP sensor of FIG. 8A cut along line C-C.
Figure 8C:
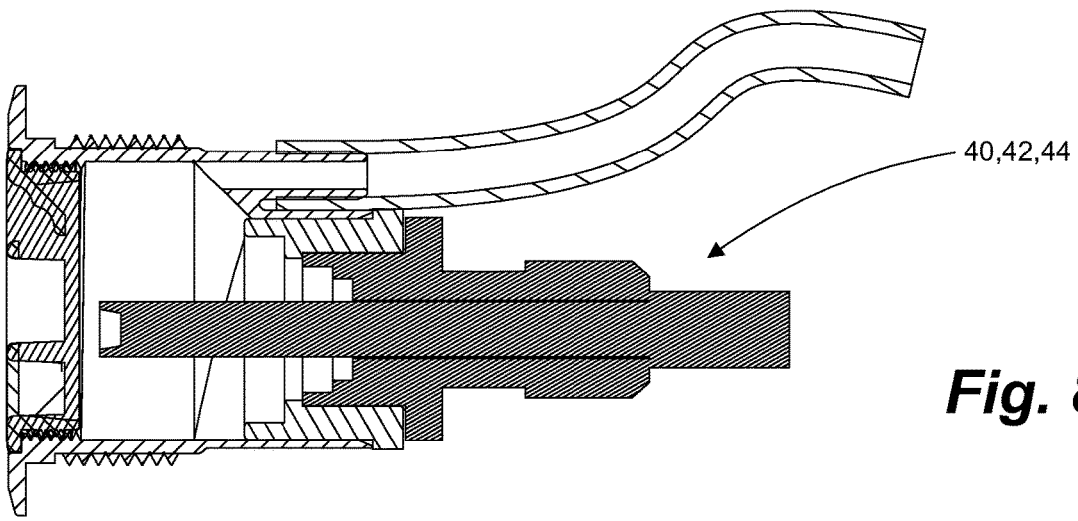
FIG. 8C is a perspective cross-sectional view of the ORP sensor of FIG. 8A cut along line C-C.

The electrodes 22 in the spa sanitation system can also be configured to allow user replacement thereof. The electrodes 22 can be replaced without draining the spa or hot tub 12. With reference to FIGS. 5 and 6B, to replace the electrodes 22 of the water sanitation system 10, the user can unscrew an electrode housing 26 and mount 28 from the spa 12 and remove the housing and mount assembly from the water. The electrode housing 26 can then be removed from the mount 28 and replaced with a new housing 26 containing new electrodes 22, and the housing 26 and mount 28 assembly can be reinstalled in the spa 12. The electrode housing 26 and mount 28 can be configured to form a watertight assembly when coupled, such that water cannot come into contact with electrical components therein when the assembly is removed from the spa 12.

The applicant, through experimentation, tested various aspects of electrodes 22 including base materials, coating materials, sizes of plates, spacing of plates, orientation of plates, voltage, current and polarity switching. The applicant found that a suitable base material can be titanium and a suitable coating for the plates can be iridum oxide with 20% ruthenium. In a depicted embodiment, the water sanitation system 10 uses 5-plate electrodes 22 to provide a greater surface area and has a current density of 0.4 A/in$^2$. In the embodiments described herein, all the electrodes 22 used in the water sanitation system 10 are composed of the same materials. In other embodiments, the electrodes 22 could be made of different materials.

The invention claimed is:

1. A method for controlling a spa sanitation system of a water-containing vessel, comprising:
    acquiring Oxidation Reduction Potential (ORP) measurements, pH measurements, and temperature measurements for water in the water-containing vessel;
    determining a voltage and a current to be delivered to two or more electrodes of the spa sanitation system to electrolytically produce a sanitizer;
    determining a time period for which to run the two or more electrodes to electrolytically produce the sanitizer; and
    selecting a polarity configuration of the two or more electrodes;
    wherein the polarity configuration comprises at least a first polarity and a second polarity;
    wherein the step of selecting the polarity configuration comprises measuring a first impedance of the two or more electrodes in the first polarity and measuring a second impedance of the two or more electrodes in the second polarity, and selecting the polarity configuration having a lower impedance; and further comprising switching the polarity configuration based on the first impedance and the second impedance such that the polarity configuration with the lower impedance is used.

2. The method of claim 1, further comprising turning off pumps of the water-containing vessel.

3. The method of claim 2, wherein the steps of turning off the pumps, acquiring ORP measurements, pH measurements, and temperature measurements, determining the voltage and the current, determining the time period, and selecting the polarity configuration are performed in an operational cycle of a plurality of operational cycles.

4. The method of claim 3, further comprising periodically switching the polarity configuration if the polarity configuration was unchanged for a threshold number of consecutive operational cycles.

5. The method of claim 1, further comprising monitoring a cumulative charge delivered to the two or more electrodes in each of the first polarity and the second polarity.

6. The method of claim 1, further comprising injecting a pH adjust down chemical into the water if the pH measurements are above a maximum pH threshold.

7. The method of claim 1, wherein the voltage delivered to the two or more electrodes is increased from zero to the voltage gradually over a ramp period.

8. The method of claim 1, further comprising locating the two or more electrodes adjacent a side wall of the water-containing vessel.

9. The method of claim 1, further comprising communicating through a communications interface.

10. A sanitation system for a water-containing vessel, comprising:
a controller configured to
acquire Oxidation Reduction Potential (ORP) measurements, pH measurements, and temperature measurements for water in the water-containing vessel;
determine a voltage and a current to be delivered to two or more electrodes of the sanitation system to electrolytically produce a sanitizer;
determine a time period for which to run the two or more electrodes to electrolytically produce the sanitizer; and
select a polarity configuration of the two or more electrodes;
wherein the polarity configuration comprises at least a first polarity and a second polarity;
wherein when the controller selects the polarity configuration, it measures a first impedance of the two or more electrodes in the first polarity and measures a second impedance of the two or more electrodes in the second polarity, and selects the polarity configuration having a lower impedance; and
wherein the controller is further configured to switch the polarity configuration based on the first impedance and the second impedance such that the polarity configuration with the lower impedance is used.

11. The sanitation system of claim 10, wherein the controller is further configured to turn off pumps of the water-containing vessel.

12. The sanitation system of claim 11, wherein the turning off the pumps, acquiring ORP measurements, pH measurements, and temperature measurements, determining the voltage and the current, determining the time period, and selecting the polarity configuration are performed in an operational cycle of a plurality of operational cycles.

13. The sanitation system of claim 10, wherein the controller is further configured to periodically switch the polarity configuration if the polarity configuration was selected for a threshold number of consecutive operational cycles of a plurality of operational cycles.

14. The sanitation system of claim 10, wherein the controller is further configured to monitor a cumulative charge delivered to the two or more electrodes in each of the first polarity and the second polarity.

15. The sanitation system of claim 10, wherein the controller is further configured to inject a pH adjust down chemical into the water if the pH measurements are above a maximum pH threshold.

16. The sanitation system of claim 10, wherein the voltage delivered to the two or more electrodes is increased from zero to the determined voltage gradually over a ramp period.

17. The sanitation system of claim 10, wherein the two or more electrodes are located adjacent a side wall of the water-containing vessel.

18. The sanitation system of claim 10, wherein the controller is further configured to communicate through a communications interface.

* * * * *